United States Patent [19]
Brookes

[11] Patent Number: 5,128,083
[45] Date of Patent: Jul. 7, 1992

[54] PROCESS FOR MODIFYING THE SURFACE OF HARD ENGINEERING CERAMIC MATERIALS

[75] Inventor: Christopher A. Brookes, Brough, England

[73] Assignee: J. H. Fenner & Co. Limited, North Humberside, England

[21] Appl. No.: 488,009

[22] PCT Filed: Nov. 7, 1988

[86] PCT No.: PCT/GB88/00950
§ 371 Date: May 7, 1990
§ 102(e) Date: May 7, 1990

[87] PCT Pub. No.: WO89/04239
PCT Pub. Date: May 18, 1989

[30] Foreign Application Priority Data
Nov. 7, 1987 [GB] United Kingdom ............... 8726137

[51] Int. Cl.$^5$ ............................................. B28B 11/08
[52] U.S. Cl. ...................................... 264/162; 264/293
[58] Field of Search ................. 264/293, 340, 56, 162; 148/11.5; 427/11

[56] References Cited
U.S. PATENT DOCUMENTS
4,168,183 9/1979 Greenfield et al. ................ 148/127

Primary Examiner—James Lowe
Assistant Examiner—Christopher A. Fiorilla
Attorney, Agent, or Firm—Burns, Doane, Swecker & Mathis

[57] ABSTRACT

A process for modifying the surface of a hard engineering ceramic material by applying a point or line load to the surface of the hard engineering ceramic material by a second material such as to cause plastic deformation of the hard engineering ceramic material. The second material can be repeatedly traversed across the surface of the hard engineering ceramic material. The process is advantageously applied to a first engineering component fabricated from the hard engineering ceramic material and a second engineering component fabricated from the second material. The second material may also be a hard engineering ceramic material, and may be of the same hardness as the hard engineering ceramic material to be treated. The first and second components can be used in a tribological application and between them define a point or line contact such that in use the second engineering component reshapes the surface of the first engineering component. The first engineering component may comprise a piston ring and the second engineering component may comprise a piston cylinder, or vice-versa.

21 Claims, No Drawings

PROCESS FOR MODIFYING THE SURFACE OF HARD ENGINEERING CERAMIC MATERIALS

The present invention relates to a process for modifying the surface of hard engineering ceramic materials. These materials include compounds (oxides, carbides, nitrides, borides) of the elements silicon, boron and other transition metals, and for the purposes of the present invention can be generally defined as having a room temperature Knoop indentation hardness, using a 1 kg normal load, greater than 1000 kg/mm$^2$ (or 10 GPa).

Hard engineering ceramic materials are relatively new and in many cases the full extent of their useful applications is yet to be fully explored. However, if is known that such materials have a tendency to fracture, rather than to deform plastically, when subjected to stress at temperatures below about 0.5 of their melting points (0.5 Tm)—that is to say, they tend to be brittle at such temperatures. Consequently they are difficult to shape and, most often, components made from such materials must be made by hot pressing or sintering processes followed by grinding to the final dimensions. Grinding inevitably introduces micro surface defects and cracks which can contribute to premature failure whilst in service, particularly in tribological applications such as a piston within a piston cylinder. These difficulties in working such materials obviously limit their useful applications.

It is an object of the present invention to provide a process for modifying the surface of hard engineering ceramic materials and, more specifically, a process whereby micro surface defects and cracks in the surface of the material can be annealed and/or sealed.

According to the present invention there is provided a process for modifying the surface of hard engineering ceramics materials wherein the surface of the material is subjected to plastic deformation caused by point/line loading transmitted by the surface of a second material.

Throughout this specification the term "point loading" is intended to define forces transmitted from a pointed surface to a plane surface as between a pencil and paper. The term "line loading" is intended to define the forces transmitted from a line surface to a plane surface as between a wedge, chisel or cylinder and a plane surface.

Preferably, the second material is loaded against the hard engineering ceramics material which is being treated at a sufficiently high temperature to cause the second material to flow into and replicate the surface features of the hard engineering ceramics material by creep. Conveniently, this process is carried out at a temperature less than 0.5 Tm. (Tm equals the temperature at which the hard engineering ceramics material melts). The second material may conveniently comprise a second hard engineering ceramic material, but this may be of the same hardness or even softer than the hard engineering ceramic material which is being treated.

Using the process of the present invention two major benefits accure:

1. Firstly, defects introduced by grinding the material, such as cracks, are healed with a consequent improvement in wear resistance.
2. Secondly, small changes in surface topography can be developed and controlled. Thus, one ceramic surface can be caused to develop optimum conformity to another by deforming these surfaces in a non-impactive manner under creep conditions. This means that a piston and piston cylinder can be treated to conform with each other for optimum tribological coupling in use at normal operating temperatures.

Conveniently, the surface of the hard engineering ceramics material can be hardened by repeatedly traversing (rubbing) it with a softer lubricated metal. It has been shown by experiment that the hardness of the hard engineering ceramics material may be increased by some 60% in this way and the increase in hardness is permanent. Furthermore, the wear resistance of the material is increased under three-body-wear conditions that is to say where wear debris or oxide particles are trapped between two surfaces which are wearing against one another.

It has been found that the principle variables which have to be controlled during treatment of a hard engineering ceramics material in accordance with the process of the present invention to achieve the benefits ascribed above are as follows:

1. The stress developed during point/line loading must be sufficient to exceed the critical resolved shear stress to move and multiply dislocations, in the crystalline solid being modified, but not to develop localized cracking.

2. The temperature at which the process is carried out must be less than that at which adhesion and seizure would occur between the surface of the hard engineering ceramics material being treated and the second material applying the point/line loading through processes of bulk diffusion yet high enough to enable significant dislocation mobility. This will usually be in the range 0.3 Tm to 0.5 Tm.

3. The optimum time of contact between the surfaces of the hard engineering ceramics material and the second material applying the point/line loading will be dependent upon temperature.

4. The atmosphere in which the process of the present invention is carried out may be controlled, e.g. it may be vacuum, inert, or reactive, in order to prevent degradation of the surface or to induce improved surface properties (such as adjustments to non-stoichiometric composition, etc.).

According to the present invention there is provided a process for treating the surface of a component comprised of hard engineering ceramics materials wherein the surface of the material is subjected to plastic deformation caused by point/line loading transmitted by the surface of a second hard engineering ceramic material.

In a preferred embodiment of the present invention two components both comprised of hard engineering ceramics materials and intended for use in a tribological application are treated in accordance with the process of the present invention, one against the other, to ensure optimum conformity between facing surfaces of the two components. The components may both be comprised of the same hard engineering ceramics material, or one may be comprised of a softer hard engineering ceramics material than the other.

An embodiment of the present invention will now be described, by way of example.

Consider a piston within a piston cylinder. Either or both of these may be fabricated using a hard engineering ceramics material to attain the benefits and advantages inherent in using such materials. However, using conventional fabrication techniques the hard engineering ceramics material must be ground to its final dimensions if the piston is to fit accurately within the bore of the piston cylinder and to a greater or less extent this gives rise to micro surface defects and cracks in the ground surface.

In the process of the present invention the piston and the piston cylinder are fabricated conventionally up to the stage immediately prior to grinding except that the bore of the piston cylinder is somewhat undersized and the diameter of the piston ring corresponds to the ultimate or specified diameter of the piston cylinder bore. Conventionally, the piston ring is fabricated from a harder engineering ceramics material than that of the piston cylinder itself, although it should be understood that they may equally be of the same hardness.

The piston ring is introduced into the bore of the piston cylinder at a temperature roughly equal to 0.5 Tm and is then driven the working length of the piston cylinder bore. The perimeter of the piston ring contacting the internal surface of the piston cylinder bore defines a line contact there between and the line loading between the two surfaces ensures that the surface of the piston ring contacting the internal surface of the piston cylinder is modified by the process of creep to conform to the internal surface of the piston cylinder. The actual rate of travel of the piston ring through the piston cylinder bore is determined and specified in accordance with the other operating characteristics of the process, such as roughness of the surface to be modified, the degree of undersize, the temperature and the rate of deformation.

Modification of the piston ring to match the internal surface of the piston cylinder bore would follow the same process as that described previously, but in this instance the diameter of the piston ring is slightly oversize and the piston cylinder is fabricated from the harder engineering ceramics material.

It should be appreciated that whilst the present invention has been described with reference to a piston and piston cylinder other components made from hard engineering ceramics maybe treated using the process of the present invention. It will be readily apparent to a person skilled in the art that the equipment or apparatus used to implement the process of the present invention will vary from one component to another according to its particular shape and contour, but that the basic principle of treating the surface of the component by the application of a point/line load remains the same.

I claim:

1. A process for plastically deforming the surface of a first hard engineering ceramic material, comprising applying a line load to the surface of said first hard engineering ceramic material by a second hard engineering ceramic material and plastically deforming said surface of said first hard engineering ceramic material whereby microsurface defects and cracks in said surface of said first hard engineering ceramic material are healed.

2. A process according to claim 1, wherein said second hard engineering ceramic material is repeatedly traversed across at least part of said surface of said first hard engineering ceramic material.

3. A process according to claim 1, wherein said second hard engineering ceramic material has a hardness which is not greater than that of said first hard engineering ceramic material.

4. A process according to claim 1, wherein a first engineering component is fabricated from said first hard engineering ceramic material and a second engineering component is fabricated from said second hard engineering ceramic material, which first and second components are used in a tribological application and between them define a line contact such that in use the second engineering component modifies the surface of the first engineering component.

5. A process according to claim 4, wherein the first engineering component is a piston ring and the second engineering component is a piston cylinder.

6. A process according to claim 4, wherein the first engineering component is a piston cylinder and the second engineering component is a piston.

7. A process for plastically deforming a surface of a first hard engineering ceramic material, comprising:
applying a non-impactive point or line load to a surface of said first hard engineering ceramic material by a second hard engineering ceramic material and plastically deforming said surface of said first hard engineering ceramic material whereby microsurface defects and cracks in said surface of said first hard engineering ceramic material are healed.

8. A process according to claim 7, wherein said second hard engineering ceramic is repeatedly traversed across at least part of the surface of said first hard engineering ceramic material.

9. A process according to claim 7, wherein said second hard engineering ceramic material has a hardness which is not greater than that of said first hard engineering ceramic material.

10. A process according to claim 7, wherein a first engineering component is fabricated from said first hard engineering ceramic material and a second engineering component is fabricated from said second hard engineering ceramic material, which first and second components are used in a tribological application and between them define a point or line contact such that in use the second engineering component modifies the surface of the first engineering component.

11. A process according to claim 10, wherein the first engineering component is a piston ring and the second engineering component is a piston cylinder.

12. A process according to claim 10, wherein the first engineering component is a piston cylinder and the second engineering component is a piston.

13. A process for plastically deforming the surface of a first component of a first hard engineering ceramic material, comprising:
a step of plastically deforming said surface of said first component by contacting said surface of said first component with a surface of a second component of a second hard engineering ceramic material and applying a point or line load on said surface of said first component by moving said surface of said second component relative to said surface of said first component, the load being sufficient to cause plastic deformation of said surface of said first component whereby microsurface defects and cracks in said surface of said first hard engineering ceramic material are healed.

14. A process of claim 13, wherein the plastic deformation step is carried out by sliding contact between said first hard engineering ceramic material and said second hard engineering ceramic material.

15. The process of claim 13, further comprising a step of grinding the surface of said first hard engineering ceramic material prior to the plastic deformation step, the plastic deformation step resulting in repair of defects or cracks introduced into the surface of said first hard engineering ceramic material during the grinding step.

16. The process of claim 13, wherein said second hard engineering ceramic material changes shape due to creep during the plastic deformation step so as to conform to a shape of the surface of said first hard engineering ceramic material.

17. The process of claim 13, wherein the plastic deformation step is carried out by repeatedly traversing at least part of the surface of said first hard engineering ceramic material with said second hard engineering ceramic material.

18. The process of claim 13, wherein the loading during the plastic deformation step applies a stress to the surface of the first component in excess of a critical resolved shear stress of said first hard engineering ceramic material, the loading causing plastic deformation of the surface of the first component without localized cracking of the surface of the first component.

19. The process of claim 13, wherein the loading during the plastic deformation is carried out at a temperature which enables significant dislocation mobility in said first hard engineering ceramic material and prevents adhesion or seizure between the surfaces of the first and second components.

20. The process of claim 13, wherein the first and second components are of the same material.

21. The process of claim 19, wherein the temperature is about 0.3 to 0.5 a melting temperature of said first hard engineering ceramic material.

* * * * *